(12) United States Patent
Dai et al.

(10) Patent No.: US 11,373,356 B2
(45) Date of Patent: Jun. 28, 2022

(54) METHOD AND SYSTEM FOR EFFICIENT RENDERING OF 3D PARTICLE SYSTEMS FOR WEATHER EFFECTS

(71) Applicant: Robert Bosch GmbH, Stuttgart (DE)

(72) Inventors: Zeng Dai, Sunnyvale, CA (US); Liu Ren, Cupertino, CA (US); Lincan Zou, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 15/938,526

(22) Filed: Mar. 28, 2018

(65) Prior Publication Data

US 2019/0304158 A1     Oct. 3, 2019

(51) Int. Cl.

| | |
|---|---|
| *G06T 15/00* | (2011.01) |
| *G06T 15/20* | (2011.01) |
| *G06T 19/00* | (2011.01) |
| *G06T 17/00* | (2006.01) |
| *G06T 19/20* | (2011.01) |

(52) U.S. Cl.
CPC ............ *G06T 15/005* (2013.01); *G06T 15/20* (2013.01); *G06T 17/00* (2013.01); *G06T 19/00* (2013.01); *G06T 19/20* (2013.01)

(58) Field of Classification Search
CPC ..... G06T 19/20; G06T 17/00; H04N 21/6582; H04N 21/44222; G06F 3/048
See application file for complete search history.

(56) References Cited

U.S. PATENT DOCUMENTS

| | | | |
|---|---|---|---|
| 5,469,535 A | | 11/1995 | Jarvis et al. |
| 5,831,614 A | * | 11/1998 | Tognazzini ............. G06F 3/033 715/784 |

(Continued)

FOREIGN PATENT DOCUMENTS

| | | |
|---|---|---|
| EP | 1953701 A1 | 8/2008 |
| WO | 9963489 A1 | 12/1999 |

OTHER PUBLICATIONS

Schneider, Andrew et al., "The Real-Time Volumetric Cloudscapes of Horizon: Zero Dawn", Advances in Real-Time Rendering 2015, SIGGRAPH 2015 (99 pages).

(Continued)

*Primary Examiner* — Saptarshi Mazumder
(74) *Attorney, Agent, or Firm* — Maginot, Moore & Beck LLP (57) ABSTRACT

A method for generating graphics of a three-dimensional (3D) virtual environment includes: receiving, with a processor, a first camera position in the 3D virtual environment and a first viewing direction in the 3D virtual environment; receiving, with the processor, weather data including first precipitation information corresponding to a first geographic region corresponding to the first camera position in the 3D virtual environment; defining, with the processor, a bounding geometry at first position that is a first distance from the first camera position in the first viewing direction, the bounding geometry being dimensioned so as to cover a field of view from the first camera position in the first viewing direction; and rendering, with the processor, a 3D particle system in the 3D virtual environment depicting precipitation only within the bounding geometry, the 3D particle system having features depending on the first precipitation information.

18 Claims, 6 Drawing Sheets

(56) References Cited

U.S. PATENT DOCUMENTS

| | | | |
|---|---|---|---|
| 6,268,861 B1 | 7/2001 | Sanz-Pastor et al. | |
| 6,384,830 B2 | 5/2002 | Baron et al. | |
| 6,788,304 B1 | 9/2004 | Hart et al. | |
| 6,961,061 B1 | 11/2005 | Johnson et al. | |
| 7,724,258 B2 | 5/2010 | Ebert et al. | |
| 8,624,926 B2 * | 1/2014 | Varadhan | G06T 15/20 |
| | | | 345/653 |
| 9,752,889 B2 | 9/2017 | Ren et al. | |
| 2006/0253246 A1 * | 11/2006 | Cera | G08G 1/096861 |
| | | | 701/117 |
| 2009/0164896 A1 * | 6/2009 | Thorn | G06F 1/1626 |
| | | | 715/700 |
| 2013/0083060 A1 * | 4/2013 | Lawson | G09G 5/14 |
| | | | 345/630 |
| 2015/0040073 A1 * | 2/2015 | Barcay | G06F 3/04815 |
| | | | 715/850 |
| 2017/0154460 A1 | 6/2017 | Hu | |
| 2018/0256272 A1 * | 9/2018 | Maeda | A61B 34/00 |

OTHER PUBLICATIONS

Biagioli, Adrian, "Understanding Perlin Noise", Aug. 9, 2014, flafla2.github.io/2014/08/09/perlinnoise.html, retrieved Mar. 28, 2018 (14 pages).

"Mie Scattering", Wikipedia, Jan. 27, 2018, https://en.wikipedia.org/wiki/Mie_scattering, retrieved Mar. 28, 2018 (7 pages).

\* cited by examiner

210 — Receive a first camera position in the 3D virtual environment and a first viewing direction in the 3D virtual environment.

220 — Receive weather data including first precipitation information corresponding to a first geographic region corresponding to the first camera position in the 3D virtual environment.

230 — Define a bounding geometry at first position that is a first distance from the first camera position in the first viewing direction, the bounding geometry being dimensioned so as to cover a field of view from the first camera position in the first viewing direction.

240 — Render a 3D particle system in the 3D virtual environment depicting precipitation only within the bounding geometry, the 3D particle system having features depending on the first precipitation information.

Receive a second camera position in the 3D virtual environment and a second viewing direction in the 3D virtual environment.

260

Move the bounding geometry to a second position that is the first distance from the second camera position in the second viewing direction.

270

Update the rendering of the 3D particle system depicting the precipitation such that particles of the 3D particle system are only rendered within the moved bounding geometry.

METHOD AND SYSTEM FOR EFFICIENT RENDERING OF 3D PARTICLE SYSTEMS FOR WEATHER EFFECTS

FIELD

This disclosure relates generally to the field of driver information and driver assistance systems (also known as in-vehicle information systems) and, more specifically, to systems and methods that provide graphical displays to a vehicle operator for mapping and navigation applications.

BACKGROUND

Unless otherwise indicated herein, the materials described in this section are not prior art to the claims in this application and are not admitted to the prior art by inclusion in this section.

Modern motor vehicles often include one or more driver information and driver assistance systems (hereinafter referred to as in-vehicle information systems) that provide a wide variety of information and entertainment options to occupants in the vehicle. Common services that are provided by the in-vehicle information systems include, but are not limited to, vehicle state and diagnostic information, mapping and navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

Three-dimensional (3D) graphics methods have been widely used in different driver assistance and driver information applications. One typical example is navigation systems based on 3D maps. Compared with traditional two-dimensional (2D) maps, 3D maps are considered to be more helpful for easy driver orientation and fast location recognition. For example, photorealistic 3D mapping and navigation services are provided by multiple online and offline services including services offered by Apple, Google, and Nokia. Modern 3D graphics can produce a wide range of highly realistic graphical effects. In the context of 3D mapping and navigation applications, a graphics display system can generate landmarks such as geographic features, streets, buildings, and other landmarks in great detail. Furthermore, some 3D mapping systems can apply graphical effects that depict the weather and lighting conditions in the 3D virtual environment that correspond to the actual weather conditions in the real geographic region that is reproduced in the mapping application. For example, 3D graphics systems can produce graphical renderings of precipitation based on the current weather conditions in a geographic region.

While modern 3D graphics hardware and software is capable of reproducing a wide range of graphics, the generation of graphical effects such as precipitation typically requires substantial hardware execution resources to produce the graphical effects with a reasonable rendering speed for use a 3D mapping application. Modern processing devices including graphics processing units (GPUs) that can perform complex graphical rendering of realistic precipitation exist, but many hardware platforms including the graphics systems that are integrated into motor vehicles and those of inexpensive mobile electronic devices may lack the necessary hardware to produce realistic graphical depictions of precipitation. Furthermore, even some mobile electronic devices that now include increasingly powerful graphics hardware may consume an undesirably large amount of electrical power to produce the graphics, which often results in a drained battery that can be counterproductive to the use of a mapping and navigation application when traveling. Consequently, improvements to methods and systems for producing graphical renderings of precipitation in a 3D virtual environment in a computationally efficient manner would be beneficial.

SUMMARY

A method for generating graphics of a three-dimensional (3D) virtual environment is disclosed. The method comprises: receiving, with a processor, a first camera position in the 3D virtual environment and a first viewing direction in the 3D virtual environment; receiving, with the processor, weather data including first precipitation information corresponding to a first geographic region corresponding to the first camera position in the 3D virtual environment; defining, with the processor, a bounding geometry at first position that is a first distance from the first camera position in the first viewing direction, the bounding geometry being dimensioned so as to cover a field of view from the first camera position in the first viewing direction; and rendering, with the processor, a 3D particle system in the 3D virtual environment depicting precipitation only within the bounding geometry, the 3D particle system having features depending on the first precipitation information.

A system for generating graphics of a three-dimensional (3D) virtual environment is disclosed. The system comprises: a display device configured to display the graphics of the 3D virtual environment; a networking device; a memory configured to store programmed instructions; and a processor operatively connected to the display device, the wireless networking device, and the memory. The processor is configured to execute the programmed instructions to: receive a first camera position in the 3D virtual environment and a first viewing direction in the 3D virtual environment; receive, via the networking device, weather data including first precipitation information corresponding to a first geographic region corresponding to the first camera position in the 3D virtual environment; define a bounding geometry at first position that is a first distance from the first camera position in the first viewing direction, the bounding geometry being dimensioned so as to cover a field of view from the first camera position in the first viewing direction; and render a 3D particle system in the 3D virtual environment depicting precipitation only within the bounding geometry, the 3D particle system having features depending on the first precipitation information.

BRIEF DESCRIPTION OF THE DRAWINGS

The foregoing aspects and other features of the method and system are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

In-Vehicle Information System

Figure 1:
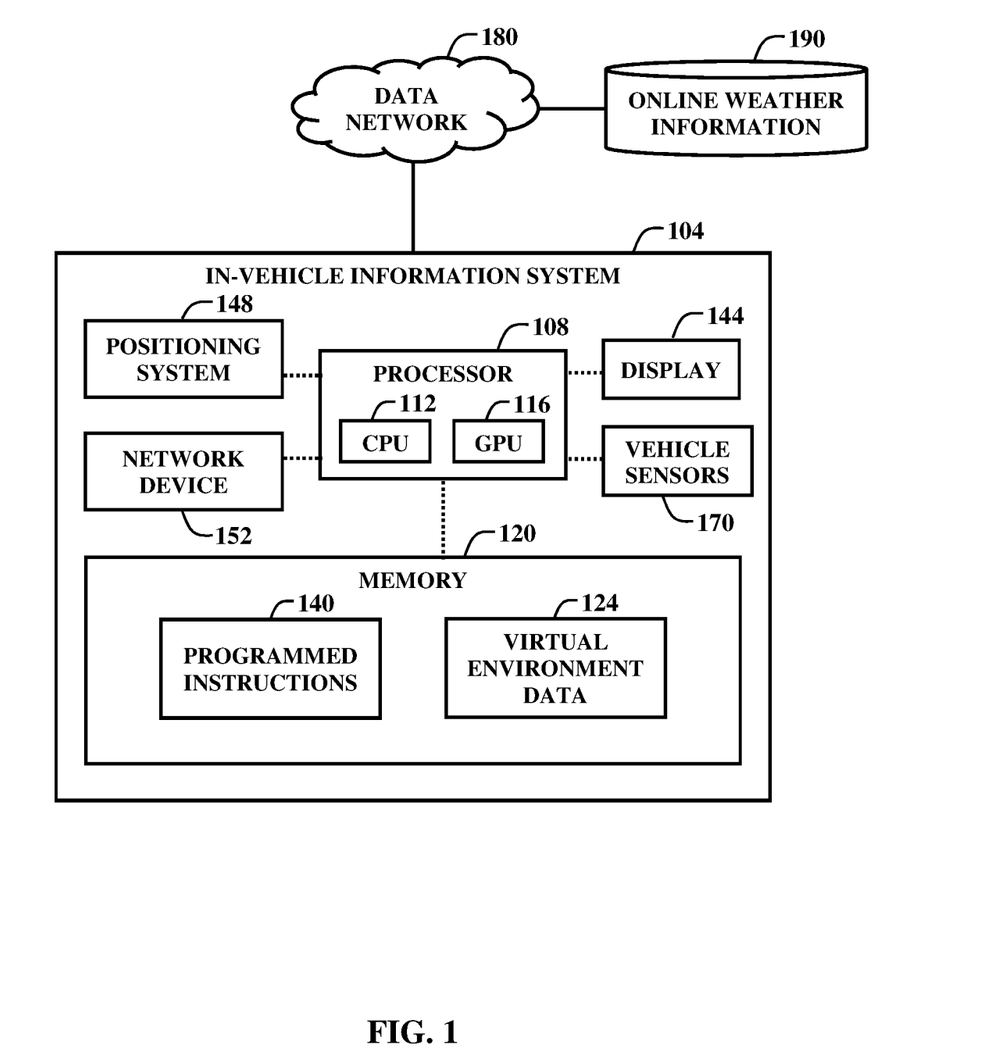
FIG. 1 is a schematic diagram of an in-vehicle information system that is configured to generate a graphical display of a 3D virtual environment including a representation of precipitation that reflects current weather conditions in a real-world geographic location.

FIG. 1 depicts a system 100 that includes an in-vehicle information system 104 (which may also be referred to herein as a "graphical display system") that generates a graphical display of a 3D virtual environment including a representation of precipitation that reflects current weather conditions in a real-world geographic location in a computationally efficient manner. The in-vehicle information system 104 includes a processor 108, memory 120, display 144, optional positioning system 148, and optional network device 152. Hardware embodiments of the in-vehicle information system 104 include, but are not limited to, personal computer (PC) hardware, embedded system hardware including embedded computing hardware for use in a motor vehicle, and mobile electronic devices including smartphone and tablet computing devices. In the system 100, a wireless data network 108 connects the in-vehicle information system 104 to one or more online weather information sources 190.

In the in-vehicle information system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU includes hardware and software for display of both 2D and 3D graphics. In one embodiment, processor 108 executes software drivers and includes hardware functionality in the GPU 116 to generate 3D graphics using, for example, the OpenGL, OpenGL ES, Vulkan, or Direct3D graphics application programming interfaces (APIs). For example, the GPU 116 includes one or more hardware execution units that implement fragment shaders, vertex shaders, and optionally geometry shaders, tessellation shaders, and compute shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications. The stored program instructions 140 include software that control the operation of the CPU 112 and the GPU 116 to generate graphical depictions of precipitation based on the embodiments described herein.

The processor 108 executes the mapping and navigation program and generates 3D graphical output with graphical transformations that depict map features and weather conditions including precipitation in a geographic region that is external to the vehicle an intuitive manner. The processor 108 is configured with software and hardware functionality by storing programmed instructions in one or memories operatively connected to the processor 108 and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104. In some embodiments the GPU 116 and the CPU 112 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device. In addition to the programmed instructions 140, the memory 120 stores three dimensional virtual environment graphics data 124. The graphics data 124 include geometric models, textures, and other data that the processor 108 uses to generate three-dimensional graphics of a 3D virtual environment.

The in-vehicle information system 104 includes an optional network device 152 that is configured to send and receive weather data from external computing systems, such as the online weather information sources 190, through a data network 180. Examples of the network device 152 include wired network adapters such as Ethernet and universal serial bus (USB) adapters, and wireless network adapters such as wireless wide area network (WWAN), 802.11 or Bluetooth wireless local area network (WLAN) adapters.

As depicted in FIG. 1, the online weather information sources 190 include any online service that provides data in a manner that is accessible by the in-vehicle information system 104 through the data network 180. For example, online information sources 190 include live weather services that provide information related to the weather in a geographic region around the vehicle, including cloud cover, wind, temperature, precipitation, and road hazard conditions. Another online information source 190 is an online traffic service that produces reports regarding traffic volume, accidents, and other traffic information.

The in-vehicle information system 104 includes an optional positioning system device 148 that is operatively connected to the processor 108. Examples of positioning systems include global positioning system (GPS) receivers that use one or more satellite navigation systems, radio triangulation receivers that identify a location of the in-vehicle information system 104 with respect to fixed wireless transmitters, and inertial navigation systems. During operation, the processor 108 executes mapping and navigation software applications that retrieve location information from the positioning system 148 to identify a geographic location of the in-vehicle information system 104 and to adjust the display of the virtual environment to correspond to the location of the in-vehicle information system 104. In navigation applications, the processor 108 identifies the location and movement of the in-vehicle information system 104 for the generation of routes to selected destinations and display of the routes in the 3D virtual environment.

During operation, the processor 108 receives data corresponding to the environment around the vehicle from multiple sources. In the embodiment of FIG. 1, the sources include the vehicle sensors 170, online weather information sources 190, and the positioning system 148. The processor 108 uses some environment data indirectly. For example, the positioning system 148 provides data pertaining the location of the vehicle, and the processor 108 uses the position data as part of a query to an online information source 190 to, for example, identify weather conditions and traffic in the geographic region around the vehicle or in another geographic region along the route of the vehicle where the vehicle will be traveling in the future.

In the in-vehicle information system 104, the display 144 is either an integrated display device, such as an LCD or other visual display device, which is integrated with a housing of the in-vehicle information system 104, or the display 144 is an external display device that is operatively connected to the in-vehicle information system 104 through a wired or wireless interface to receive output signals from the processor 108 to generate a display of the 3D virtual environment. In an embodiment where the in-vehicle information system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle. Other display device embodiments include, for example, stereoscopic displays that form two different 2D images of a 3D virtual environment to simulate a true three-dimensional display of the virtual environment.

In the in-vehicle information system 104, the vehicle sensors 170 include any device in the vehicle that generates digital data corresponding to the condition of the vehicle or the environment around the vehicle that the processor 108 uses to adjust a visual depiction of the static map features. Examples of sensors that are used in different vehicle configurations include, but are not limited to, cameras, light sensors, thermometers, hygrometers, motion sensors, speedometers, range finding sensors, and the like. In some embodiments, an in-vehicle clock is another sensor that records the time of day around the vehicle. In some embodiments, the positioning system 148 or network device 152 receive time data to set the clock and identify the position of the sun or moon in the sky at different times when the vehicle is in different geographic locations. In the example of FIG. 1, the positioning system 148 also acts as a sensor to indicate the location and optionally direction of travel and speed of the vehicle. In some vehicles, additional sensor data may be provided indirectly from subsystems that perform other functions in the vehicle.

Methods for Efficient Rendering of 3D Particle Systems for Weather Effects

Various methods and processes for rendering 3D particle systems depicting precipitation or other similar weather effects are described below. In the description of the methods, statements that the method is performing some task or function refers to a controller or general purpose processor executing programmed instructions stored in non-transitory computer readable storage media operatively connected to the controller or processor to manipulate data or to operate one or more components in the in-vehicle information system 104 to perform the task or function. Particularly, the processor 108, CPU 112, and/or GPU 116 above may be such a controller or processor and the executed program instructions may be the programmed instructions 140 stored in the memory 120. Additionally, the steps of the methods may be performed in any feasible chronological order, regardless of the order shown in the figures or the order in which the steps are described.

Figure 2:
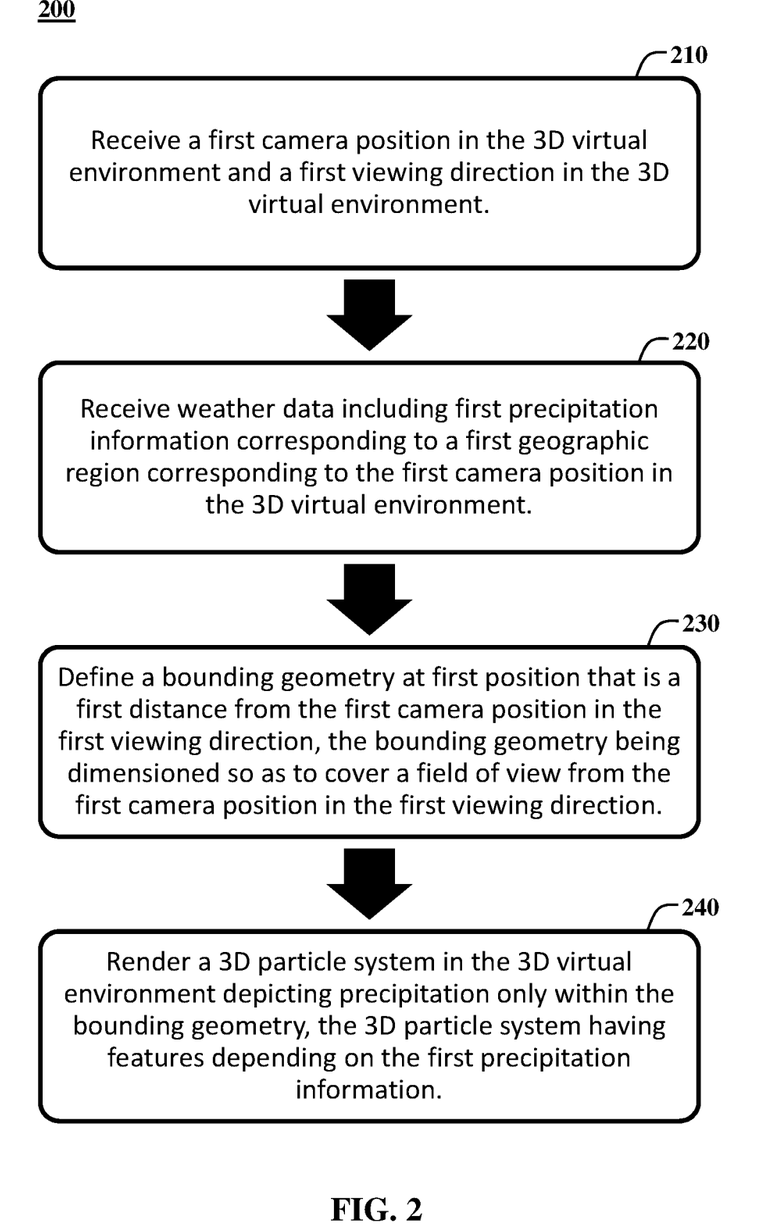
FIG. 2 shows a method for rendering 3D particle systems depicting precipitation or other similar weather effects in a 3D virtual environment in a computationally efficient manner.

FIG. 2 shows a method 200 for rendering 3D particle systems depicting precipitation or other similar weather effects in a 3D virtual environment in a computationally efficient manner. Particularly, as applied to the mapping and navigation application discussed above, the method 200 generates a graphical display of a 3D virtual environment including a representation of precipitation that reflects current weather conditions in a real-world geographic location around the vehicle. The method 200 improves the functioning of the in-vehicle information system 104 by enabling the processor 108 to execute a set of specific rules to efficiently render 3D particle systems depicting precipitation or other similar weather effects in a 3D virtual environment. Additionally, the method 200 is efficient enough to be used on embedded devices and mobile devices having relatively limited processing capabilities.

As used herein, the term "precipitation" refers to rain, drizzle, freezing rain, snow, sleet, hail, and the like, as well as to any mixture of the aforementioned weather conditions. As applied to precipitation, the "particles" of the 3D particle system may depict snowflakes, snow grains, snow pellets, raindrops, frozen raindrops, ice pellets, or the like. However, the method 200 is applicable to any other weather conditions the might be depicted as a 3D particle system, such a sandstorm, fog, wind, tornados, hurricanes, fire, sparks, etc.

The method 200 begins with a step of receiving a first camera position in the 3D virtual environment and a first viewing direction in the 3D virtual environment (block 210). Particularly, with respect to the embodiments described in detail herein, the processor 108 is configured to receive a current camera position and a current viewing direction of a virtual camera in a 3D virtual environment. In some embodiments, the processor 108 is further configured to receive a current viewing range and/or a current viewing angle of the virtual camera in the 3D virtual environment. The camera position, viewing direction, viewing range, and viewing angle are each parameters of the virtual camera and define a view and/or perspective of the 3D virtual environment which is to be rendered by the processor 108 and displayed on the display 144 to assist the user in visualizing a geographic region. At least one embodiment, the processor 108 is configured to read the parameters of the virtual camera from the memory 120, but may also receive them from some other system or processor. In some embodiments, the processor 108 is configured to automatically adjust the parameters of the virtual camera based on a position and/or direction of movement of the vehicle and/or the in-vehicle information system 104 indicated by the positioning system 148. Furthermore, in some embodiments, the processor 108 is configured to adjust the parameters of the virtual camera based on inputs from the user, such as from a touch screen, buttons, knobs, or other input devices of the in-vehicle information system 104. In some embodiments, the processor 108 is configured to receive additional information regarding the 3D virtual environment including mesh data for objects in the 3D virtual environment, road and navigation information, information regarding a ground plane or surface of the 3D virtual environment, and a direction of gravity, which are used to render features of the 3D virtual environment.

As used herein the "camera position" (which may also be referred to as the "position" or "point of origin" of the field of view) of a virtual camera refers to position in a 3D virtual environment from which a view of the 3D virtual environment is rendered. The camera position can be defined as a set of coordinates within the 3D virtual environment, e.g. ($X_{cam}$, $Y_{cam}$, $Z_{cam}$), or in any other suitable manner. In some embodiments, the camera position may be subject to certain boundary constraints, such as being above a ground plane of the 3D virtual environment or being within a predetermined distance from a position of the vehicle and/or the in-vehicle information system 104 indicated by the positioning system 148.

As used herein the "viewing direction" (which may also be referred to as the "direction" of the field of view) of a virtual camera refers to a direction from the camera position in which a view of the 3D virtual environment is rendered. The viewing angle can be defined as a directional vector that extends from the camera position, e.g. <$X_{view}$, $Y_{view}$, $Z_{view}$>, or in any other suitable manner.

As used herein the "viewing angle" (which may also be referred to as the "angle" of the field of view) of a virtual camera refers to an angle with respect to a ground plane of the 3D virtual environment from which a view of the 3D virtual environment is rendered. The viewing angle is generally a function of the camera position and the viewing direction. In one example, the viewing angle can be defined with respect to a range of angles defined between a perpendicular overhead view and a parallel horizontal view. The perpendicular overhead view is one in which the viewing direction is pointed directly down from the camera position and perpendicular with the ground plane of the 3D virtual environment. The parallel horizontal view is one in which the viewing direction is pointed parallel to the ground plane of the 3D virtual environment. However, the viewing angle can be defined in any other suitable manner.

As used herein the "viewing range" (which may also be referred to as the "range" or "width" of the field of view) of a virtual camera refers to a width of a field of view of the 3D virtual environment or, alternatively, to a distance of the camera position from objects and/or a ground plane in the view of the 3D virtual environment. The viewing range is generally a function of the camera position and the viewing direction. Generally, as the viewing range is increased, a larger portion of the geographic region is represented in the view of the 3D virtual environment.

The method 200 continues with a step of receiving weather data including first precipitation information corresponding to a first geographic region corresponding to the first camera position in the 3D virtual environment (block 220). Particularly, the processor 108 is configured to operate the network device 152 to receive and/or retrieve weather data from the one or more online weather information sources 190, via the data network 180, corresponding to the geographic region of the camera position. The weather data at least includes precipitation information which indicates, for example, whether it is precipitating and, if so, a precipitation type (e.g., rain, snow, sleet, etc.) and precipitation intensity (e.g., light, medium, or heavy). In some embodiments, the weather data further includes wind information which indicates, for example, a wind speed and wind direction.

Figure 3:
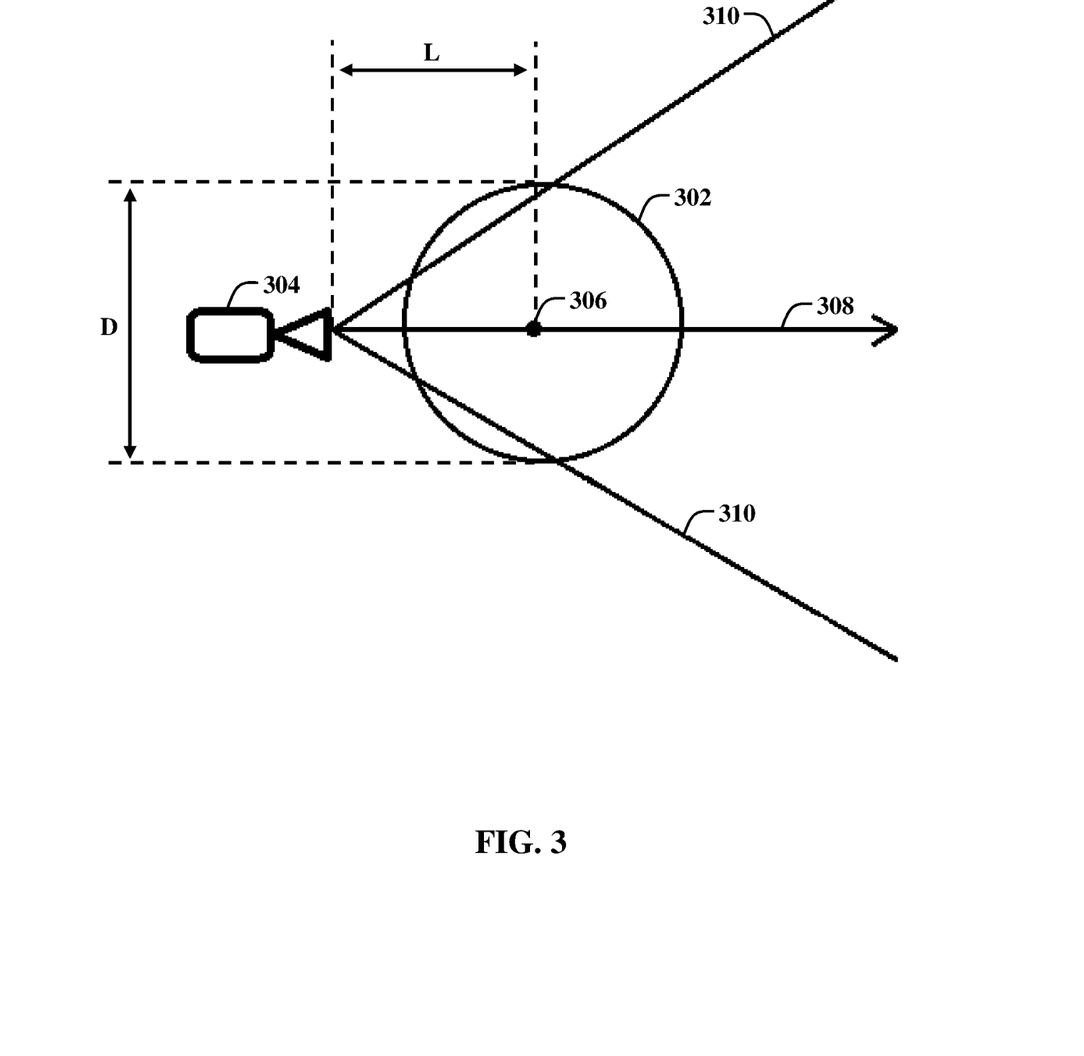
FIG. 3 shows an exemplary bounding geometry defined with respect to a virtual camera.

The method 200 continues with a step of defining a bounding geometry at first position that is a first distance from the first camera position in the first viewing direction, the bounding geometry being dimensioned so as to cover a field of view from the first camera position in the first viewing direction (block 230). Particularly, the processor 108 is configured to define a bounding geometry at a position that a predefined distance from the current camera position in the current viewing direction. The processor 108 is configured to define the bounding geometry with dimensions configured to cover and/or encompass a field of view from the current camera position in the current viewing direction. FIG. 3 shows an exemplary bounding geometry 302 defined with respect to a virtual camera 304. The bounding geometry 302 is positioned at a position 306 that is a distance L from a position of the virtual camera 304 in a viewing direction 308. As shown, the bounding geometry 302 comprises a sphere having a diameter D greater than a width of a field of view 310 of the virtual camera 304 at the distance L. In this way, the bounding geometry 302 is defined in front of the virtual camera and dimensioned such that it encompasses the field of view 310 of the virtual camera 304. In other embodiments, suitable bounding geometries other than a sphere may be used.

In some embodiments, the processor 108 is configured to periodically or continuously adjust the predefined distance (e.g., the distance L) and/or a dimension of the bounding geometry (e.g., the diameter D of the spherical bounding geometry 302) based on a current viewing direction, a current viewing angle, and/or a current viewing range based on pre-defined functions, so as to maximize visibility of the bounding geometry 302 to the virtual camera 304. For example, the processor 108 may be configured to adjust the predefined distance and/or a dimension of the bounding geometry to be larger when the camera is configured to provide an overview of a region (i.e., zoomed out) as compared to when the camera is configured to provide a close-up view of small area (i.e., zoomed in). In this way, the 3D particle system would appear further away when the camera is zoomed out and closer when the camera is zoomed in.

Returning to FIG. 2, the method 200 continues with a step of rendering a 3D particle system in the 3D virtual environment depicting precipitation in the only within the bounding geometry, the 3D particle system having features depending on the first precipitation information (block 240). Particularly, the processor 108, or more particularly the GPU 116, is configured to render a 3D particle system in the 3D virtual environment depicting precipitation only within the defined bounding geometry. In at least one embodiment, the processor 108 is configured to render the 3D particle system only if the precipitation information indicates that there is precipitation in the geographic region around the camera position. In one embodiment, the processor 108 is configured to render the 3D particle system by randomly spawning particles within the bounding geometry with a particle density based on a precipitation intensity indicated by the precipitation information. In at least one embodiment, the processor 108 is further configured to render additionally features of the 3D virtual environment, such as roads, buildings, landmarks, etc.

Figure 4:
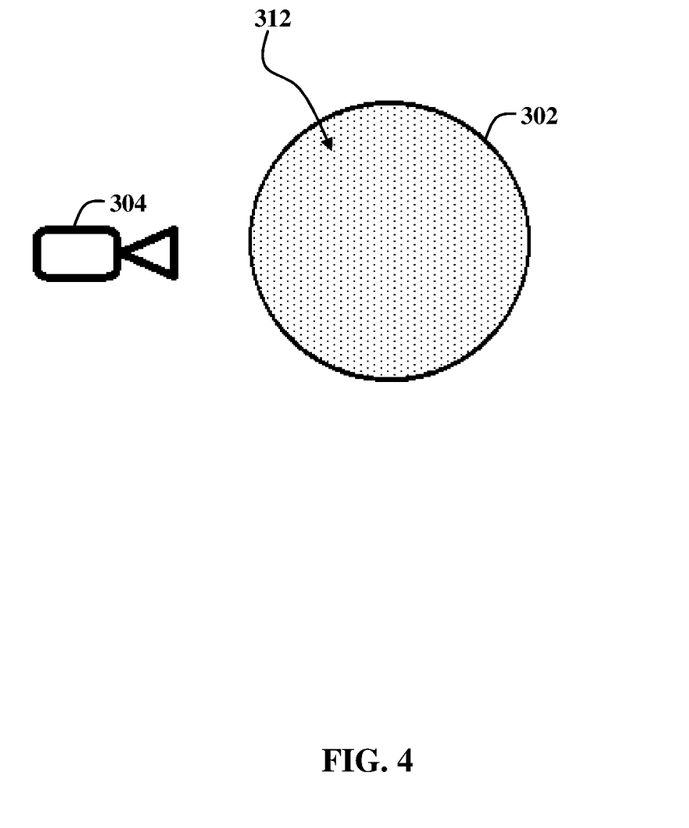
FIG. 4 shows an exemplary rendering of a 3D particle system only within the defined bounding geometry.

FIG. 4 shows an exemplary rendering of a 3D particle system 312 only within the defined bounding geometry 302. As can be seen, the bounding geometry 302 is an efficient way to optimize 3D particle simulation by reducing the amount of rendering that must be performed.

Furthermore, the processor 108 is configured to render the 3D particle system having features depending on the precipitation information of the received weather data. In one embodiment, the processor 108 is configured to render at least one of (i) a shape, (ii) a color, and (iii) opacity of particles of the 3D particle system differently depending on a type of precipitation indicated by the precipitation information. For example, if the precipitation information indicates that it is snowing in the geographic region around the camera position, the processor 108 may be configured to render the particles of the 3D particle system as an opaque white snow flake shape. Similarly, if the precipitation information indicates that it is raining in the geographic region around the camera position, the processor 108 may be configured to render the particles of the 3D particle system as a semi-transparent blue raindrop shape.

In one embodiment, the processor 108 is configured to render at least one of (i) a size of particles of the 3D particles system and (ii) a particle density of the 3D particles system differently depending on a precipitation type and/or precipitation intensity indicated by the precipitation information. For example, the processor 108 may be configured to render the particles of the 3D particle system with a relatively larger particle size if the precipitation information indicates that it is hailing in the geographic region around the camera position, as compared to when the precipitation information indicates that it is sleeting in the geographic region around the camera position. Similarly, the processor 108 may be configured to render more particles in the 3D particle system if the precipitation information indicates that the precipitation intensity is heavy, as compared to when the precipitation information indicates that the precipitation intensity is light.

In one embodiment, the processor 108 is configured to render a motion of particles of the 3D particles system based on at least one of a wind speed and a wind direction indicated by the wind information, as well as a gravity direction of the 3D virtual environment. In some embodiments, the effect of wind on the particles may depend on the type of precipitation indicated by the precipitation information (e.g., snowflakes are more influenced by the wind than raindrops).

Figure 5:
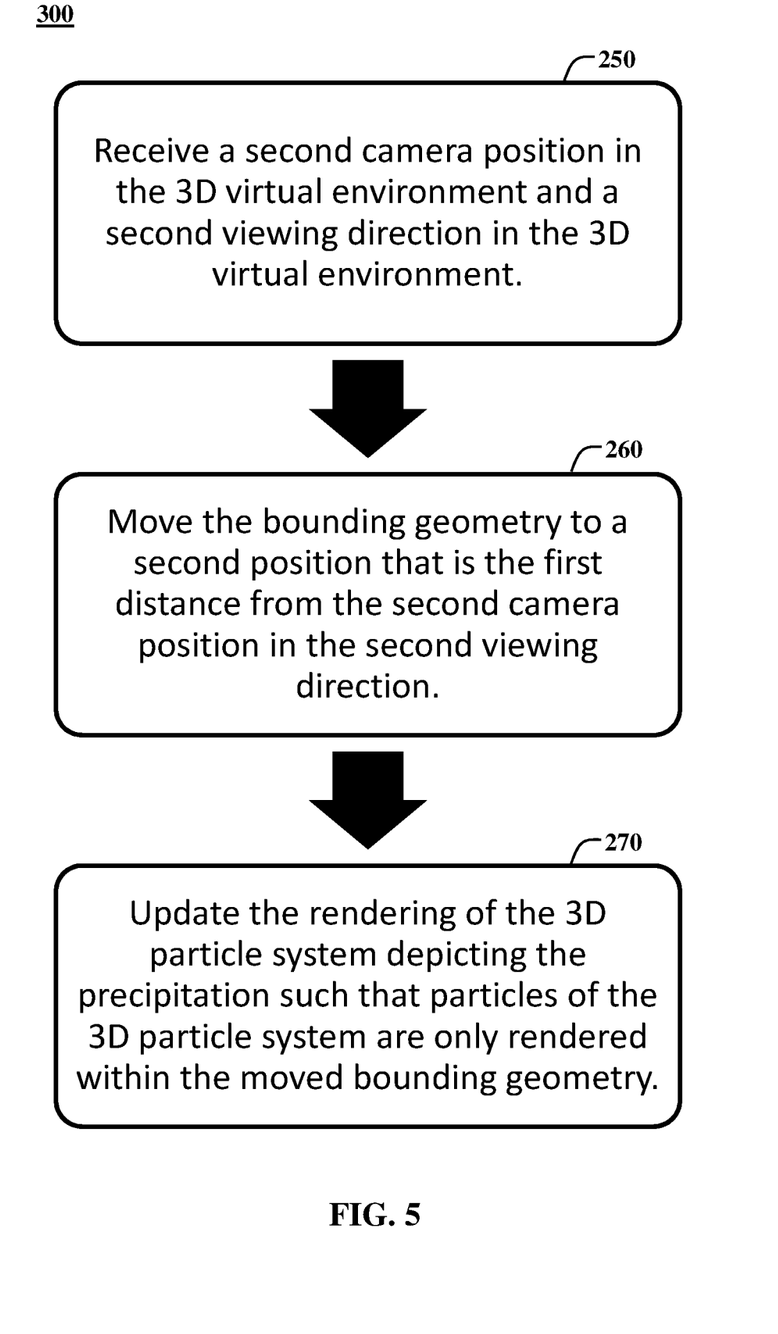
FIG. 5 shows a method, which is a continuation of the method of FIG. 2, for updating the 3D particle system as the camera position or the viewing direction is changed.

FIG. 5 shows a method 300, which is a continuation of the method 200, for updating the 3D particle system as the camera position or the viewing direction is changed. The method 300 improves the functioning of the in-vehicle information system 104 by enabling the processor 108 to execute a set of specific rules to efficiently update a 3D particle system depicting precipitation or other similar weather effects in a virtual environment as the camera position or viewing direction is changed.

The method 300 begins with a step of receiving a second camera position in the 3D virtual environment and a second viewing direction in the 3D virtual environment (block 250). Particularly, with respect to the embodiments described in detail herein, the processor 108 is configured to receive an updated current camera position and an updated current viewing direction of a virtual camera of a 3D virtual environment. In some embodiments, the processor 108 is further configured to receive an updated current viewing range and/or an updated current viewing angle of the virtual camera of the 3D virtual environment.

Figure 6:
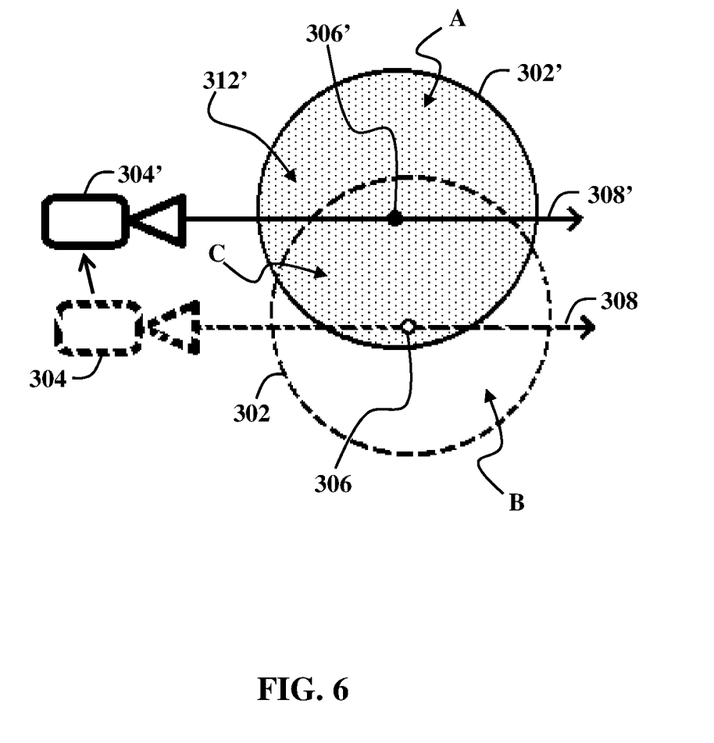
FIG. 6 shows an exemplary movement of the original bounding geometry and update to the 3D particle system.

The method 300 continues with a step of moving the bounding geometry to a second position that is the first distance from the second camera position in the second viewing direction (block 260). Particularly, the processor 108 is configured to move and/or redefine the position of the bounding geometry to an updated position that is the predefined distance (e.g., the distance L) from the updated current camera position in the updated current viewing direction. FIG. 6 shows an exemplary movement and/or redefinition of the original bounding geometry 302. Particularly, as shown, the virtual camera 304 is moved to a new position and having similar viewing direction 308' and is labeled as 304' at the new position. The bounding geometry 302 is moved and/or redefined to a new position 306' and is labeled as 302' at the new position 306'. As can be seen, the bounding geometry 302 is essentially attached to the front of the virtual camera 304 such that the 3D particle system rendered within is always visible.

Returning to FIG. 5, the method 300 continues with a step of updating the rendering of the 3D particle system depicting the precipitation such that particles of the 3D particle system are only rendered within the moved bounding geometry (block 270). Particularly, the processor 108 is configured update the rendering of the 3D particle system depicting the precipitation such that particles of the 3D particle system are only rendered within the moved bounding geometry. In at least one embodiment, the processor 108 is configured to update the rending by removing particles of the 3D particle system that were within the bounding geometry at the old position but are outside the bounding geometry after the bounding geometry is moved to the new position. Furthermore, the processor 108 is configured to update the rending by randomly spawning new particles, with a density based on the desired precipitation intensity, of the of the 3D particle system at positions that are within the bounding geometry after the bounding geometry is moved to the new position but were outside the bounding geometry at the old position. Finally, the processor 108 is configured to continue rendering particles of the 3D particle system that were within the bounding geometry at the old position and remain within the bounding geometry after the bounding geometry is moved to the new position. In some embodiments, the removed particles can be recycled to be used again. For example, since generating and then removing individual particles is usually computationally expensive, the processor 108 may be configured to generate a predefined number of particles and label them live when they are within the bounding geometry 302 or dead when they are outside the bounding geometry 302. The particles that are labeled as dead can be used to "create" new particles in the new geometry.

FIG. 6 shows an exemplary updated 3D particle system 312' after the bounding geometry 302 is moved to the new position 306'. Particularly, as can be seen, new particles are randomly spawned in a region A that is within new bounding geometry 302', but not within the old bounding geometry 302. Similarly, particles are removed from a region B that is within old bounding geometry 302, but not within the new bounding geometry 302'. Finally, particles in a region C that is within both the new bounding geometry 302' and the old bounding geometry 302 are unaffected and continue to be rendered.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for generating graphics of a three-dimensional (3D) virtual environment comprising:
    receiving, with a processor, a first value for a camera position of a virtual camera in the 3D virtual environment and a first value for a viewing direction of the virtual camera;
    receiving, with the processor, weather data including first precipitation information corresponding to a first geographic region corresponding to the first value for the camera position of the virtual camera;
    defining, with the processor, a closed 3D bounding geometry having a position that is defined relative to the camera position of the virtual camera and the viewing direction of the virtual camera such that the closed 3D bounding geometry moves with the virtual camera, the position of the closed 3D bounding geometry being defined at a first distance from the camera position of the virtual camera in the viewing direction of the virtual camera, the closed 3D bounding geometry being dimensioned so as to cover a field of view of the virtual camera in the viewing direction of the virtual camera; and
    rendering, with the processor, a 3D particle system in the 3D virtual environment depicting precipitation only within the closed 3D bounding geometry, the 3D particle system having features depending on the first precipitation information.

2. The method according to claim 1 further comprising:
    receiving, with the processor, a second value for the camera position of the virtual camera and a second value for the viewing direction of the virtual camera;
    moving, with the processor, the closed 3D bounding geometry from a first position to a second position such that the position of the closed 3D bounding geometry remains at the first distance from the camera position of the virtual camera in the viewing direction of the virtual camera; and
    updating, with the processor, the rendering of the 3D particle system depicting the precipitation such that particles of the 3D particle system are only rendered within the moved closed 3D bounding geometry at the second position.

3. The method according to claim 2, the updating the rendering of the 3D particle system comprising:
    removing particles of the 3D particle system that were within the closed 3D bounding geometry at the first position but are outside the closed 3D bounding geometry after the closed 3D bounding geometry is moved to the second position;
    continuing to render particles of the 3D particle system that were within the closed 3D bounding geometry at the first position and remain within the closed 3D bounding geometry after the closed 3D bounding geometry is moved to the second position; and
    spawning new particles of the of the 3D particle system at positions that are within the closed 3D bounding geometry after the closed 3D bounding geometry is moved to the second position but were outside the closed 3D bounding geometry at the first position.

4. The method according to claim 1, the rendering the 3D particle system further comprising:
    rendering at least one of (i) a shape, (ii) a color, and (iii) opacity of particles of the 3D particle system based on a type of precipitation indicated by the first precipitation information.

5. The method according to claim 1, the rendering the 3D particle system further comprising:
    rendering at least one of (i) a size of particles of the 3D particles system and (ii) a particle density of the 3D particle system based on a precipitation intensity indicated by the first precipitation information.

6. The method according to claim 1, the defining the closed 3D bounding geometry further comprising:
    defining the closed 3D bounding geometry as a sphere centered at the first distance from the camera position of the virtual camera in the viewing direction of the virtual camera, the sphere having a diameter configured to cover the field of view from the camera position of the virtual camera in the viewing direction of the virtual camera.

7. The method according to claim 1 further comprising:
    receiving, with the processor, at least one of a viewing range of the virtual camera and a viewing angle of the virtual camera; and
    adjusting, with the processor, at least one of the position of the closed 3D bounding geometry and a dimension of the closed 3D bounding geometry based on the at least one of the viewing range of the virtual camera and the viewing angle of the virtual camera.

8. The method according to claim 1, wherein the weather data includes wind information, the rendering the 3D particle system further comprising:
    rendering a motion of particles of the 3D particles system based on at least one of a wind speed and a wind direction indicated by the wind information.

9. The method according to claim 1, wherein the particles of the 3D particles system are configured to depict snowflakes.

10. A system for generating graphics of a three-dimensional (3D) virtual environment comprising:
    a display device configured to display the graphics of the 3D virtual environment;
    a networking device;
    a memory configured to store programmed instructions; and
    a processor operatively connected to the display device, the networking device, and the memory, the processor being configured to execute the programmed instructions to:
        receive a first value for a camera position of a virtual camera in the 3D virtual environment and a first value for a viewing direction of the virtual camera;
        receive, via the networking device, weather data including first precipitation information corresponding to a first geographic region corresponding to the first value for the camera position of the virtual camera;
        define a closed 3D bounding geometry having a position that is defined relative to the camera position of the virtual camera and the viewing direction of the virtual camera such that the closed 3D bounding geometry moves with the virtual camera, the position of the closed 3D bounding geometry being defined at a first distance from the camera position of the virtual camera in the viewing direction of the virtual camera, the closed 3D bounding geometry being dimensioned so as to cover a field of view of the virtual camera in the viewing direction of the virtual camera; and render a 3D particle system in the 3D virtual environment depicting precipitation only within the closed 3D bounding geometry, the 3D particle system having features depending on the first precipitation information.

11. The system of claim 10, the processor being further configured to execute the programmed instructions to:

receive a second value for the camera position of the virtual camera and a second value for the viewing direction of the virtual camera;

move the closed 3D bounding geometry from a first position to a second position such that the position of the closed 3D bounding geometry remains at the first distance from the camera position of the virtual camera in the viewing direction of the virtual camera; and update the rendering of the 3D particle system depicting the precipitation such that particles of the 3D particle system are only rendered within the moved closed 3D bounding geometry at the second position.

12. The system of claim 11, the processor being further configured to execute the programmed instructions to:

remove particles of the 3D particle system that were within the closed 3D bounding geometry at the first position but are outside the closed 3D bounding geometry after the closed 3D bounding geometry is moved to the second position;

continue to render particles of the 3D particle system that were within the closed 3D bounding geometry at the first position and remain within the closed 3D bounding geometry after the closed 3D bounding geometry is moved to the second position; and spawn new particles of the of the 3D particle system at positions that are within the closed 3D bounding geometry after the closed 3D bounding geometry is moved to the second position but were outside the closed 3D bounding geometry at the first position.

13. The system of claim 10, the processor being further configured to execute the programmed instructions to:

render at least one of (i) a shape, (ii) a color, and (iii) opacity of particles of the 3D particle system based on a type of precipitation indicated by the first precipitation information.

14. The system of claim 10, the processor being further configured to execute the programmed instructions to:

render at least one of (i) a size of particles of the 3D particles system and (ii) a particle density of the 3D particle system based on a precipitation intensity indicated by the first precipitation information.

15. The system of claim 10, the processor being further configured to execute the programmed instructions to:

define the closed 3D bounding geometry as a sphere centered at the first distance from the camera position of the virtual camera in the viewing direction of the virtual camera, the sphere having a diameter configured to cover the field of view from the camera position of the virtual camera in the viewing direction of the virtual camera.

16. The system of claim 10, the processor being further configured to execute the programmed instructions to:

receive at least one of a viewing range of the virtual camera and a viewing angle of the virtual camera; and adjust at least one of the position of the closed 3D bounding geometry and a dimension of the closed 3D bounding geometry based on the at least one of the viewing range of the virtual camera and the viewing angle of the virtual camera.

17. The system of claim 10, the processor being further configured to execute the programmed instructions to:

rendering a motion of particles of the 3D particles system based on at least one of a wind speed and a wind direction indicated by the wind information.

18. The system of claim 10, wherein the particles of the 3D particles system are configured to depict snowflakes.

* * * * *